United States Patent [19]

Kirby

[11] Patent Number: 4,700,655

[45] Date of Patent: Oct. 20, 1987

[54] SIGN SUPPORT STRUCTURE

[76] Inventor: Daniel Kirby, 13 Mohawk Beach Road, Montreal, Quebec, Canada

[21] Appl. No.: 900,519

[22] Filed: Aug. 26, 1986

[51] Int. Cl.[4] .............................................. G09F 17/00

[52] U.S. Cl. ...................................... 116/174; 40/610; 116/28 R; 116/209; 248/537; 403/403

[58] Field of Search ................................. 40/591-593, 40/600, 605-607, 610-612; 116/28 R, 63 P, 173-175, 209; 248/205.5, 206.5, 207, 513, 535, 536, 537, 539, 558; 403/205, 231, 307, 403

[56] References Cited

U.S. PATENT DOCUMENTS

| | | | |
|---|---|---|---|
| 2,277,981 | 3/1942 | Horton | 40/591 |
| 2,417,367 | 3/1947 | Leach | 116/175 |
| 3,241,516 | 3/1966 | Hopkins | 116/173 |
| 3,955,786 | 5/1976 | Duddy | 248/537 |
| 4,123,813 | 11/1978 | Adams | 116/173 |
| 4,375,134 | 3/1983 | Sheetz | 40/591 |
| 4,422,137 | 12/1983 | Watts | 362/390 |
| 4,574,726 | 3/1986 | Sullivan | 116/28 R |
| 4,593,877 | 6/1986 | van der Wyk | 248/512 |

FOREIGN PATENT DOCUMENTS

| | | | |
|---|---|---|---|
| 233441 | 5/1964 | Fed. Rep. of Germany | 116/63 P |
| 1524206 | 3/1967 | France | 116/63 P |

*Primary Examiner*—Charles Frankfort
*Assistant Examiner*—W. Morris Worth

[57] ABSTRACT

A sign support structure, such as for supporting a distress flag or any other information-carrying flag. The structure comprises an elongated main shaft which is secured at a lower end to a support base having a magnet therein. A flat support surface is provided under the support base whereby the base can be attached to any metal surface such as the roof top or door of a car. A coupling element is removably secured to an upper end of the main shaft and has a transverse support shaft secured thereto. The coupling element also has an axial bore opening in a lower end thereof to receive a free end portion of the upper end of the main shaft. Furthermore, the coupling element has a second bore disposed transverse to the axial bore and above a base of the axial bore and above the axial bore and below the transverse support shaft for receiving the free end portion of the main shaft when the support structure is in a storage position.

8 Claims, 5 Drawing Figures

FIG. 1
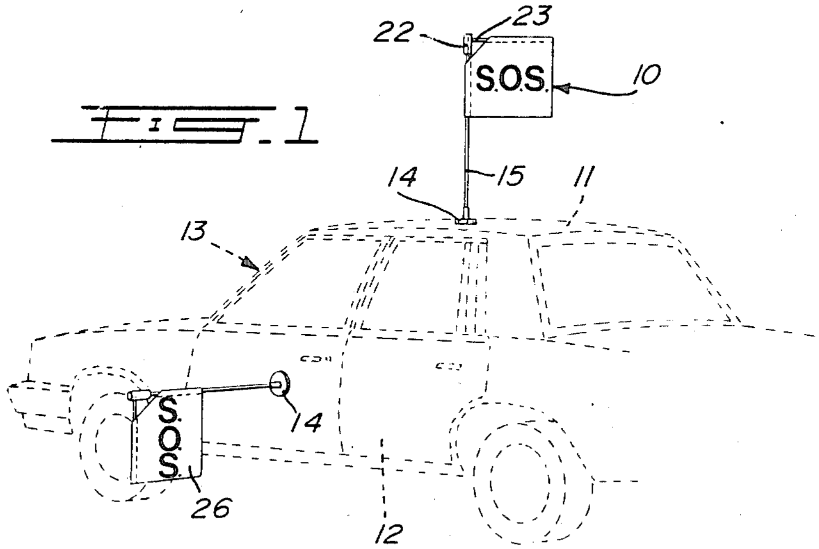
FIG. 2
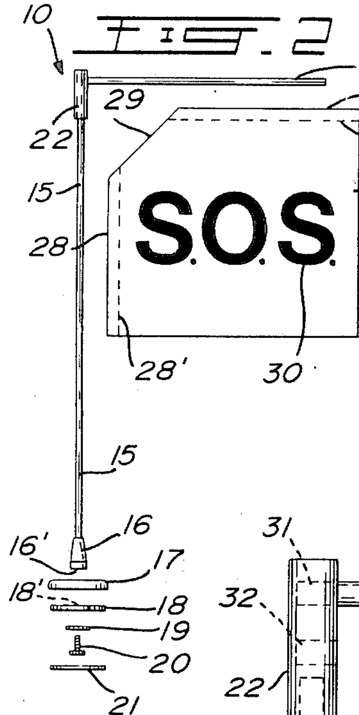
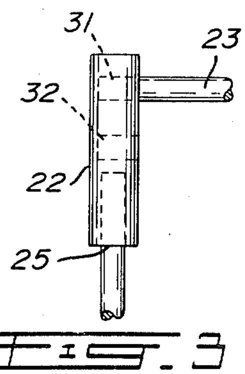
FIG. 3
FIG. 4
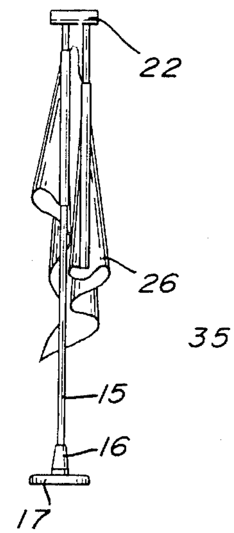
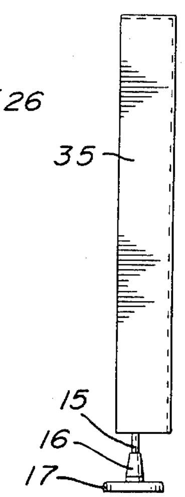
FIG. 5

SIGN SUPPORT STRUCTURE

BACKGROUND OF THE INVENTION

1. Field of Invention

The present invention relates to an improved sign support structure, and preferably, but not exclusively, to a distress flag structure which is easily attached to a metal object such as a roof top or door of a vehicle and which may easily be disassembled and stored in a small package by simply removing a coupling element which is in friction fit with a main shaft.

2. Description of Prior Art

Various sign support structures are known for supporting all kinds of signs or flag elements. Specifically, and relating to one application of the sign support structure of the present invention, reference is made to U.S. Pat. No. Des. 248,284 which discloses a distress flag structure. U.S. Pat. No. 3,241,516 also discloses another distress flag structure. A disadvantage of these or like sign support structures is that often the distress flag requires wind to display a message if printed thereon. Also, these are often permanently secured to a vehicle or else require an adapter to be permanently secured to the vehicle. They are also not easily stored and not well protected when in a storage position.

SUMMARY OF INVENTION

It is a feature of the present invention to provide an improved sign support structure, such as a distress flag structure, which is easily assembled to and from a storage position and which takes very little room for storage.

Another feature of the present invention is to provide a sign support structure, such as a distress flag structure, which is easily attached to a metal object, such as the roof top or door or any other metal part of a vehicle and which does not require a permanent connection to the vehicle.

Another feature of the present invention is to provide a sign support structure wherein the sign is a flag element containing a message thereon and wherein the flag element is easily detached from the flag support shafts.

Another feature of the present invention is to provide a sign support structure which is lightweight, easily assembled and disassembled and which is protected when in a stored position.

According to the above features, from a broad aspect, the present invention provides a sign support structure which comprises an elongated main shaft secured at a lower end to a support base. The support base has a magnet secured therein. The support base has a flat support surface underneath thereof. A coupling element is removably secured to an upper end of the main shaft. A tranverse support shaft is secured to the coupling element. The coupling element further has an axial bore opening in a lower end thereof to receive a free end portion of the upper end of the main shaft. The coupling element further has a second bore disposed transverse to the axial bore and located above the axial bore and below the transverse support shaft for receiving the free end portion of the main shaft therein when the support structure is in a storage position. A removable sign element is supported by the main and transverse shafts.

BRIEF DESCRIPTION OF DRAWINGS

A preferred embodiment of the present invention will now be described with reference to the example thereof as illustrated in the accompanying drawings in which:

FIG. 1 is a perspective view showing the sign support structure of the present invention as removably secured to an automotive vehicle;

FIG. 2 is an exploded view of the sign support structure of the present invention;

FIG. 3 is an enlarged view of the coupling element;

FIG. 4 is a perspective view showing the sign support structure in a collapsed condition; and FIG. 5 is a further perspective view showing the sign support structure in a storage position.

DESCRIPTION OF PREFERRED EMBODIMENTS

Referring now to the drawings, and more particularly to FIG. 1, there is shown generally at 10, the sign support structure of the present invention. As herein shown, the sign support structure consists of a distress flag having the words "S.O.S." printed thereon and secured to either the roof top 11 or side door frame 12 of an automotive vehicle 13. The support structure is secured thereto by a support base 14 having a magnetic element therein as will be described later.

Referring now additionally to FIGS. 2 to 4, there will be described the construction of the sign support structure 10 of the present invention. As herein shown, the structure comprises an elongated main shaft 15 which is a lightweight fiberglass rod or any other rod-like structure, of circular cross-section or any other suitable cross-section. The lower end of the main shaft 15 is secured to a support base 14 which comprises a bushing 16 secured to the lower end of the main shaft. A hollow support inverted dish-like housing 17 has a circular disc-shaped magnet 18 retained therein such as, for example, with glue. A washer 19 and fastener element 20 is received in a central cavity 18' provided in the magnet with the threaded shaft of the fastener 20 extending into a hole centrally disposed within the housing 17 and threaded into a bore provided in the lower face 16' of the bushing 16. Accordingly, the main shaft 15 is supported to the base 14. A felt disc 21 may be glued over the lower face of the magnet 18 to protect any element, such as the surface of a vehicle 13 from being scratched by the support base 14. Of course, the washer 19 may also be nested in a recessed cavity (not shown) in the magnet 18 to retain the magnet within the housing 17 and therefore it would not be necessary to glue the magnet in the housing.

A coupling element 22 is removably secured to an upper end of the main shaft 15 whereby to support a transverse support shaft 23 at substantially right angles to the main shaft 15. As shown in FIG. 3, the coupling element 22 has an axial bore having an open end 25 in the lower end of the coupling element and having a depth sufficient to be retained rigidly in press fit with the top free end portion of the shaft 15. Accordingly, a removable sign element 26, such as a distress flag, may be supported between the main shaft 15 and the transverse shaft 23.

As herein shown, the sign element 26 is a substantially rectangular piece of fabric having a tubular top edge 27 and side edge 28 formed by overlapping an edge portion of the fabric and stitching it such as at 27' and 28' to form a tubular sleeve to receive the rods 23 and 15 in close sliding fit therein. A cut out portion 29 is also provided adjacent the intersecting edge portions 27 and 28 and this is to permit the disassembly and positioning of the transverse shaft 23 and flag element 26 to a storage position, as shown in FIG. 4. As further shown in FIG. 2, the flag element 26 has a message 30, such as S.O.S., printed thereon. However, different flags with different message such as "For Sale" or "Open House" or other such messages which have other utility may be provided. Accordingly, the present invention is not restricted to a distress flag but to a sign support structure capable of displaying a message and which is preferably, but not exclusively, detachably securable to an automotive vehicle. For example, the flag structure could be secured to a metal pole, a ceiling rail, etc., etc.

Referring now to FIG. 3, there is shown more clearly the construction of the coupling element 22. As herein shown, the transverse support shaft 23 is immovably secured to the coupling element 22 in a threaded bore 31. It could also be coupled in a press fit bore or glued into a friction fit bore 31. The coupling element 22 is further provided with a second bore 32 which is disposed transverse to the axial bore 24 and located above the bottom end of the axial bore 24 and the bore 31 retaining the vertical shaft 23. The bore 32 could also intersect the bore 24 and provide the same utility and that being to receive the top free end portion of the main shaft 15 therein whereby to support the transverse support shaft 23, which is of light construction, to the main shaft 15 in close parallel relationship to the main shaft 15 as shown in FIG. 4. In this collapsed storage position, the flag element 26 is merely rolled about the main and transverse shafts and a cover envelope 35 is positioned over the shafts and flag element 26 to protect the flag and to provide a compact package for storage purposes.

Another feature of the coupling element is that it provides for quick assembly and disassembly of the flag element 26 from a storage position to a display position. All that is necessary to do is to lift off the coupling element 22 from its close fit with the top end of the main support shaft 15 and to place it into storage position as shown in FIG. 4. Thus, the flag is ready for storage. The cut out portion 29 in the flag provides for ease of assembly and disassembly and also provides clearance for the coupling element 22.

It is within the ambit of the present invention to cover any obvious modifications of the example of a preferred embodiment disclosed herein, provided such modifications fall within the scope of the appended claims.

I claim:

1. A sign support structure comprising an elongated main shaft secured at a lower end to a support base, said support base having a magnet secured therein, a flat support surface under said support base, a coupling element removably secured to an upper end of said main shaft, a transverse support shaft secured to said coupling element, said coupling element having an axial bore opening in a lower end thereof to receive a free end portion of said upper end of said main shaft, said coupling element further having a second bore disposed transverse to a longitudinal axis of said axial bore and located above said axial bore and below said transverse support shaft for receiving said free end portion of said main shaft when said support structure is in a storage position, a removable flag supported by said main and transverse shafts, said second bore being dimensioned to receive said free end portion ofsaid main shaft in friction fit therein, when said support structure is in said storage position, said main shaft and transverse support shaft being disposed substantially parallel and in close relationship to one another with said flag retained by said transverse shaft and said main shaft.

2. A sign support structure as claimed in claim 1, wherein said flag is substantially rectangular and has a tubular top and side edge, and a cut out portion disposed in adjacent end portions of said top and side edge.

3. A sign support structure as claimed in claim 1, wherein said support base comprises a bushing secured to said lower end of said main shaft, a hollow support housing having said magnet retained therein, a fastener receiving cavity disposed internally and centrally in said support housing, and a fastener threadably received in a lower end of said bushing from inside said cavity.

4. A sign support structure as claimed in claim 3, wherein a protective felt material is glued to a bottom end of said support housing concealing said magnet and fastener.

5. A sign support structure as claimed in claim 1, wherein said main shaft and transverse shaft are elongated rods of lightweight material, said axial bore having a cross-section configured to the cross-section of said main shaft for close friction fit of said shaft free end portion therein.

6. A sign support structure as claimed in claim 5, wherein said rods are fiberglass rods of circular cross-section.

7. A sign support structure as claimed in claim 1, wherein a cover envelope is positioned over said shafts and flag when said support structure is in said storage position.

8. A sign support structure as claimed in claim 1, wherein said transverse support shaft is threadably secured to said coupling element in a third threaded bore disposed adjacent a top end thereof and substantially parallel to said second bore.

* * * * *